May 3, 1955  W. E. STRAIN ET AL  2,707,322
METHOD AND APPARATUS FOR CONNECTING CLINCH NUT AND PANEL
Filed May 1, 1952
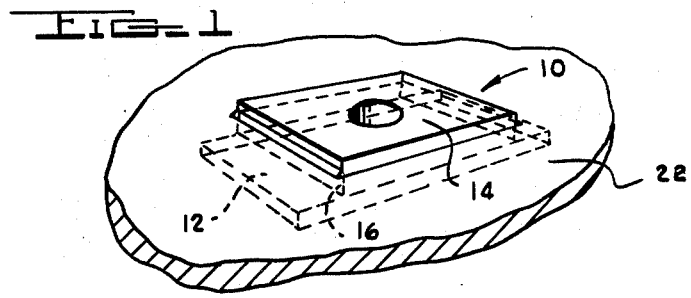
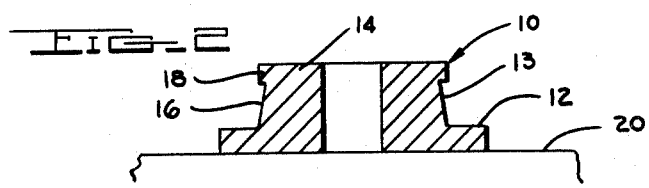
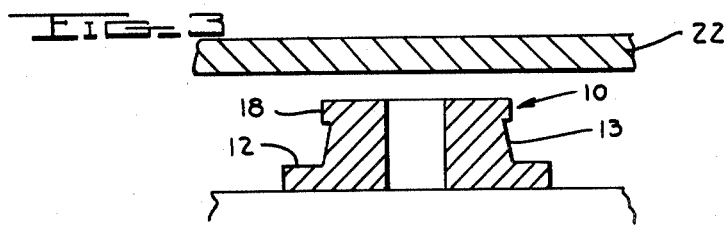
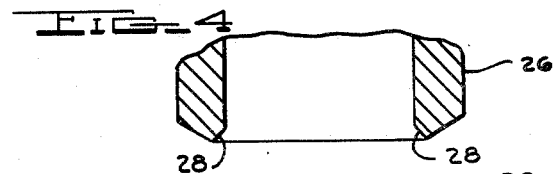
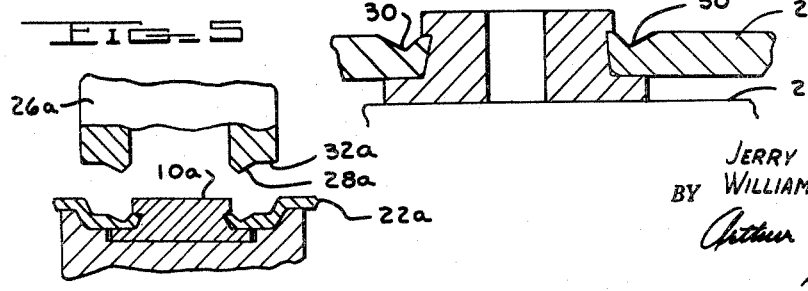
INVENTORS.
JERRY H. STEWARD
BY WILLIAM E. STRAIN
ATTORNEY

United States Patent Office 2,707,322
Patented May 3, 1955

2,707,322

METHOD AND APPARATUS FOR CONNECTING CLINCH NUT AND PANEL

William E. Strain and Jerry H. Steward, Dearborn, Mich.; said Strain assignor to said Steward Application May 1, 1952, Serial No. 285,500

4 Claims. (Cl. 29—432)

The present invention relates to a method and apparatus for rigidly affixing a nut to a plate or panel member.

Applicants have provided a nut construction which is extremely efficient and which is a vast improvement over prior known constructions. This nut construction is the subject of our copending application Serial No. 285,449. The nut is affixed to a panel member or the like by the unique method of the present invention which quickly and easily joins the panel and nut together in a substantially fluid-tight joint. The construction resulting from the present method is unusual and highly efficient. Thus the nut may be used in refrigerators or the like where a liquid or a gas is contained therein. In addition, the nut may be assembled substantially flush with the panel and embossing of the panel is avoided if desired. However, if it is desired to emboss the panel member, this operation can be accomplished in the same step as the fastening operation with the apparatus of the present invention.

It is a principal object of the present invention to provide a method of affixing a nut to a panel member wherein the resulting joint affords an effective seal.

It is another object of the present invention to provide a method of affixing a nut to a panel member which is simple and efficient and which permits assembly at a high rate of speed.

It is another object of the present invention to provide a method of affixing a nut to a panel member which requires a minimum amount of apparatus and involves a small number of simple steps.

It is a further object of the present invention to provide apparatus for fastening a nut to a panel member and in the same operation embossing the said panel member.

Other objects of this invention will appear in the following description and appended claims, reference being had to the accompanying drawings forming a part of this specification wherein like reference characters designate corresponding parts in the several views.

In the drawings:

Fig. 1 is a perspective view of a nut affixed to a panel by the method of the present invention, only a fragmentary section of the panel being shown for convenience;

Fig. 2 illustrates the first step of the present invention wherein the nut is disposed in place for insertion through a panel member;

Fig. 3 illustrates the second step of the present invention wherein the panel member is positioned adjacent the nut;

Fig. 4 illustrates the final step of the method wherein the die is withdrawn from the panel and nut assembly; and Fig. 5 is a view similar to Fig. 4 and demonstrates the apparatus and method of joining the nut to the panel member and in the same step embossing the said panel member.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, a nut 10 is disclosed which has flanges 12 extending outwardly from the bottom thereof. A groove 13 is undercut into the rectangular body 14 of the nut to provide the tapered wall 16 and the shoulder 18. The flanges and grooves are preferably formed at either two sides of the nut as shown in Fig. 1 or in four sides of the nut as disclosed in our previously mentioned copending application.

The first step in the method of the present invention is the disposition of the nut 10 on a support 20. In the preferred embodiment of the present invention the nut is used as a punch to pierce the panel, and thus the nut must be affixed securely in position. One means of accomplishing this is with a magnetic support, but any other suitable means may be used. As shown in Fig. 3, the panel 22 is then placed in position adjacent the nut. Next the nut is used as a punch to pierce a slug from the panel, and the nut extends through the panel with the flanges 12 against one side thereof. At the same time that the nut 10 pierces the panel 22, the die 26, Fig. 4, engages the panel and the outwardly flared edges 28 of the die engage the panel at 30 and swage the metal of the panel into the grooves 13 of the nut against the walls 16 and shoulders 18 to provide a tight seal between the nut and the panel. When the nut is used as the punch, the hole in the panel will closely conform to the shape and size of the nut and sloppy fits due to irregular nuts are avoided.

Although it is preferred to pierce the panel with the nut, an opening can be formed in the panel beforehand and the nut inserted therethrough in a subsequent step. The opening in the panel may be substantially the same size as the body of the nut or slightly smaller or larger.

In the construction shown in Fig. 4 either the nut and its support may be movable and the die stationary or vice versa. In either event, the nut itself acts as the tool or punch for use in cooperation with the die.

The present method of affixing a nut to a panel member is extremely simple and efficient and produces a highly unusual product at a minimum cost.

In conventional constructions whereby a clinch nut is upset to engage a metal panel, it is necessary to emboss the metal panel in a separate step before upsetting the nut. If the embossing is attempted after the upsetting operation, then the edges of the metal panel around the upset nut are drawn away from the nut by the embossing operation and the joint between the panel and the nut becomes insecure. This additional embossing operation consumes time and money which are saved by the apparatus disclosed in Fig. 5 of the drawings, whereby embossing and swaging of the metal panel are accomplished in a single step.

Referring to Fig. 5 of the drawings, the die 26A is provided with a swaging surface 28A and an embossing surface 32A. As the nut 10A is punched through the panel 22A, the swaging surface 28A of the die engages the panel first and swages a portion of the panel. This holds the panel securely in position as the embossing operation is effected by the embossing surface 32A of the die 26A. Thus, the embossing is accomplished slightly after the upsetting of the panel and in the same step of the process.

Having thus described our invention, we claim:

1. The method of affixing a nut having a flanged bottom and a groove in the side thereof to a metal panel comprising in a single step the operation of simultaneously punching said nut through said panel until the flanged bottom thereof engages one side of said panel, swaging the panel to flow a portion of its metal into the groove of said nut and provide a densified portion within said groove, holding the nut and panel in position with the swaging device, and embossing the said panel to render at least one face of the nut flush with the adjacent panel surface.

2. A unitary die construction for use in affixing a nut having a groove in the side thereof to a panel and embossing said panel in the same step, comprising an embossing surface and a swaging surface extending slightly beyond said embossing surface so that said swaging surface will engage said panel before said embossing surface and hold said panel in position adjacent said nut during the embossing operation, a pair of cutting surfaces so disposed adjacent the swaging surface as to allow freeing and deforming of a portion of said panel to provide sufficient metal for a swaging operation, and a deforming portion immediately adjacent said swaging surface.

3. The method of affixing a threaded nut having a flanged bottom and a groove in the side thereof to a metal panel comprising in a single step the operation of simultaneously moving said nut through said panel until the flanged bottom thereof engages one side of said panel, swaging part of the panel to flow a portion of its metal into the groove of said nut and provide a densified portion within said groove while holding the nut and panel in position with the swaging device, and completely affixing said nut to said panel.

4. The method of affixing a threaded nut having a flanged bottom and a groove in the side thereof to a metal panel comprising in a single step the operation of striking two edges of said nut against said panel to free a portion of said panel for a deforming action, immediately thereafter punching said nut on through said panel until the flanged bottom thereof engages one side of said panel, swaging part of the panel to flow a portion of its metal into the groove of said nut and provide a densified portion within said groove while holding the nut and panel in position with the swaging device, and completely affixing said nut to said panel.

References Cited in the file of this patent

UNITED STATES PATENTS

| | | |
|---|---|---|
| 210,476 | Trageser | Dec. 3, 1878 |
| 513,655 | Schoen | Jan. 30, 1894 |
| 521,825 | Shipe | June 26, 1894 |
| 1,252,289 | Murray | Jan. 1, 1918 |
| 2,018,683 | Meyer | Oct. 29, 1935 |
| 2,120,711 | Phillips | June 14, 1938 |
| 2,176,846 | Werme | Oct. 17, 1939 |
| 2,236,180 | Kost | Mar. 25, 1941 |